E. H. RYON.
MULTIPLIER FOR LOOMS.
APPLICATION FILED SEPT. 3, 1915.

1,184,027.

Patented May 23, 1916.
9 SHEETS—SHEET 1.

Fig.1.

Inventor
Eppa H. Ryon

Southgate & Southgate
Attorneys.

E. H. RYON.
MULTIPLIER FOR LOOMS.
APPLICATION FILED SEPT. 3, 1915.

1,184,027.

Patented May 23, 1916.
9 SHEETS—SHEET 3.

Inventor
Eppa H. Ryon

Southgate & Southgate
Attorneys.

E. H. RYON.
MULTIPLIER FOR LOOMS.
APPLICATION FILED SEPT. 3, 1915.

1,184,027.

Patented May 23, 1916.
9 SHEETS—SHEET 4.

E. H. RYON.
MULTIPLIER FOR LOOMS.
APPLICATION FILED SEPT. 3, 1915.

1,184,027.

Patented May 23, 1916.
9 SHEETS—SHEET 7.

Inventor
Eppa H. Ryon
Southgate & Southgate
Attorneys.

E. H. RYON.
MULTIPLIER FOR LOOMS.
APPLICATION FILED SEPT. 3, 1915.

1,184,027.

Patented May 23, 1916.
9 SHEETS—SHEET 8.

Inventor
Eppa H. Ryon

Southgate & Southgate
Attorneys

UNITED STATES PATENT OFFICE.

EPPA H. RYON, OF WALTHAM, MASSACHUSETTS, ASSIGNOR TO CROMPTON & KNOWLES LOOM WORKS, OF WORCESTER, MASSACHUSETTS, A CORPORATION OF MASSACHUSETTS.

MULTIPLIER FOR LOOMS.

1,184,027.   Specification of Letters Patent.   Patented May 23, 1916.

Application filed September 3, 1915. Serial No. 48,797.

*To all whom it may concern:*

Be it known that I, EPPA H. RYON, a citizen of the United States, residing at Waltham, in the county of Middlesex and State of Massachusetts, have invented a new and useful Multiplier for Looms, of which the following is a specification.

This invention relates to a multiplier of general application, but particularly adapted for controlling the indicating levers in a drop-box loom. By their relative positions the indicating levers determine the particular shuttle which shall be placed in operation at any given point in the pattern or design.

Multiplying devices for controlling the indicating levers have been heretofore known and used, but the construction thereof has been exceedingly complicated, as has also been the arrangement of the pattern upon the pattern chains.

It is the general object of my invention to provide an improved multiplier of comparatively simple construction and one in which the pattern chains are reduced to extremely simple combinations.

With this general object in view one important feature of my invention relates to the construction of a multiplier in which a single actuating member is selectively brought into operative relation with any one of a series of pattern cylinders. By this construction the driving mechanism is much simplified and the use of numerous clutches and starting devices is avoided.

Another feature of my invention relates to the provision of an improved form of starting lever so constructed that the indication of the pattern chain will be made during the advance movement of the pattern roll, the indication being completed and the lever returning to normal inoperative position as the roll reaches its position of rest. With this arrangement it is possible to start any pattern cylinder at any time regardless of the positions of the remaining cylinders. At the same time the combinations in the pattern chains are greatly simplified.

A further important feature of my invention relates to the provision of a repeating pattern mechanism by the use of which a pattern chain can be made to repeat itself for a predetermined number of times. Thus the body of a blanket or other design fabric may be woven by any desired number of repetitions of a simple pattern after which another pattern cylinder will be started by the repeating mechanism to control the weaving of the border at the end of the body design.

Other features of my invention relate to an improved and simplified reversing mechanism by the use of which either the primary or the auxiliary pattern chain may be automatically reversed; to improved driving and selective mechanisms; and to other arrangements and combinations of parts which will be hereinafter described and more particularly pointed out in the appended claims.

A preferred form of my invention is shown in the drawings, in which—

Referring to the drawings, the indicating levers 30 and 31 (Fig. 1) are pivotally mounted upon a rod 32, supported at each end in side frame members 33 and 34. The members 33 and 34 are secured to a supporting frame 35, (Figs. 2 and 3) which frame is secured to the loom frame by fastening devices (not shown). The indicating levers 30 and 31 (Figs. 1 and 17) are shown as provided with hook-shaped portions at their inner ends, adapted to be connected to the usual devices for controlling the drop-box mechanism of a loom.

While I have shown my invention as adapted for application to a drop-box loom, it will be understood that it is capable of application for similar purposes to many other machines.

The indicating levers 30 and 31 are positioned for operation by a primary pattern cylinder 40 (Figs. 1, 7 and 9) provided with the usual pattern chain 41 and rolls 42. The levers 30 and 31 are also provided with extensions $30^a$ and $31^a$ (Fig. 17) connected to the indicating levers by intermediate portions $30^b$ and $31^b$. The extensions $30^a$ and $31^a$ are positioned for operation by an auxiliary pattern cylinder 50, (Figs. 1 and 6) provided with a pattern chain 51 and rolls 52.

Figures 4, 11, 12:
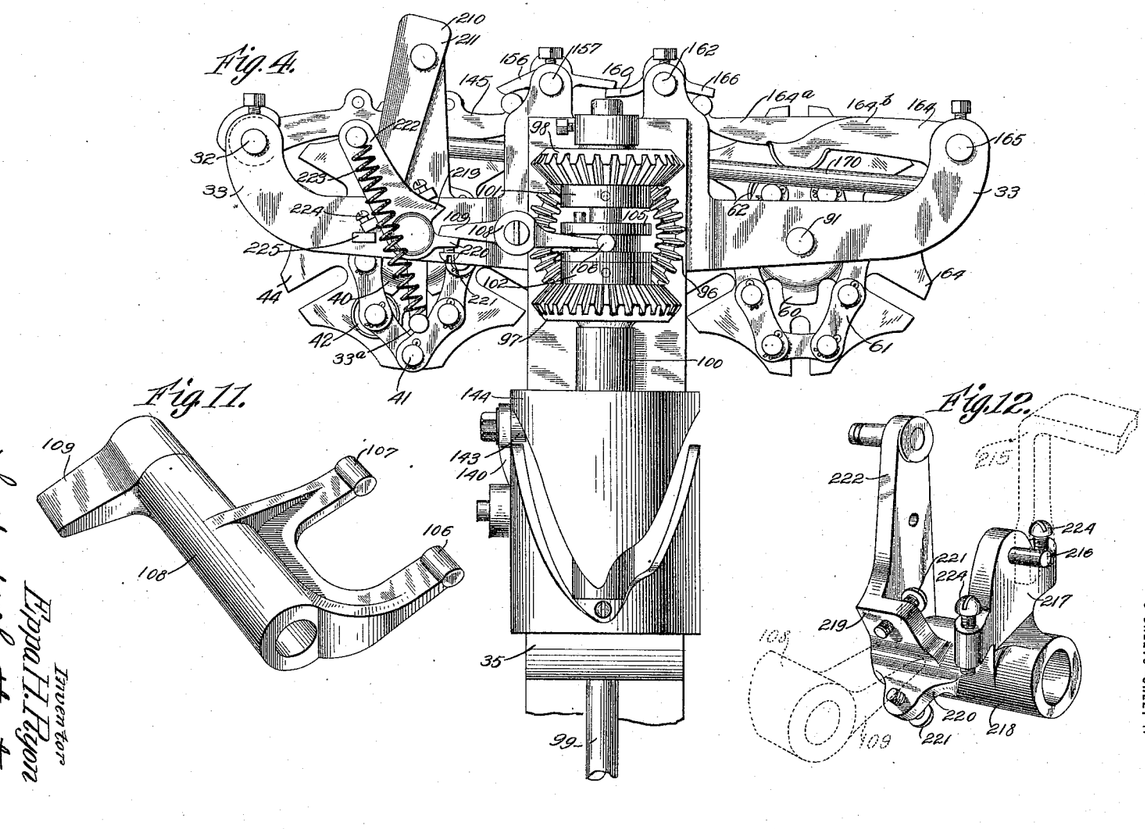
Fig. 4 is a left-hand end elevation.
Figs. 11 and 12 are detail perspective views of parts of the reversing mechanism.
Figures 6, 15, 16:
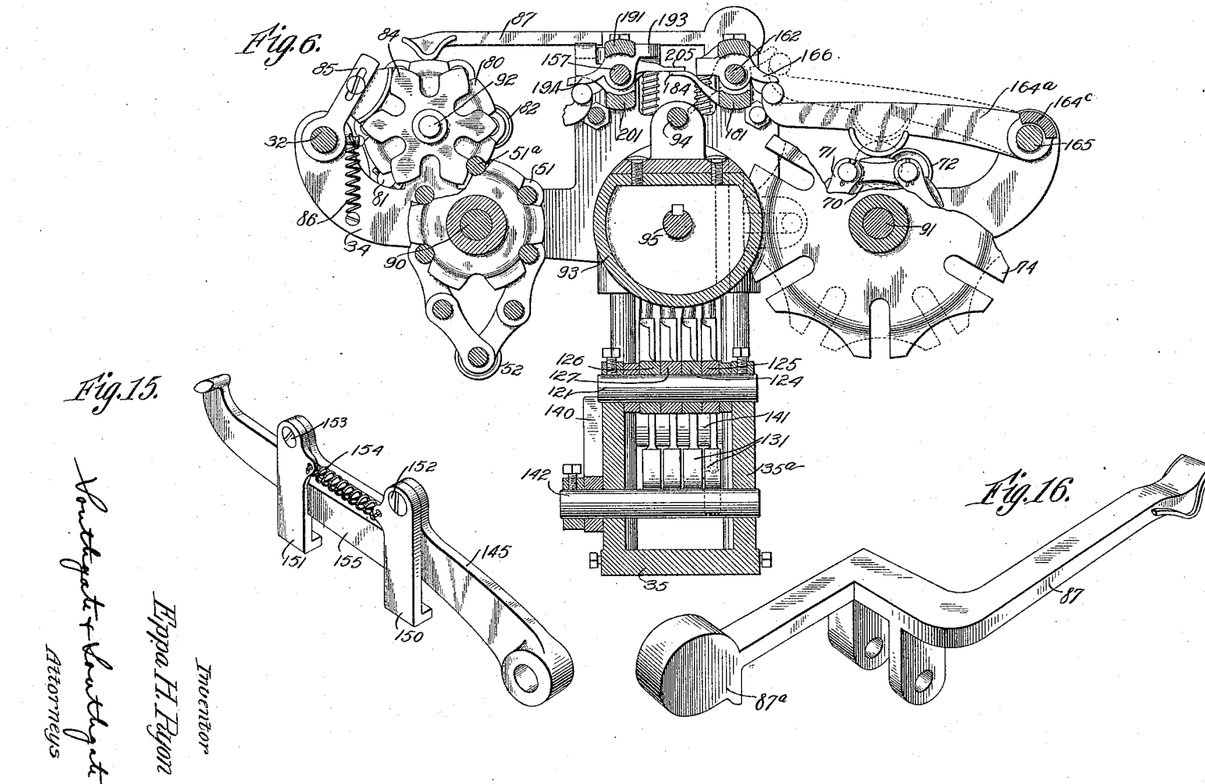
Fig. 6 is a sectional elevation taken along the line 6—6 in Fig. 1.
Fig. 15 is a detail perspective view of one form of starting lever.
Fig. 16 is a detail perspective view of the starting lever which is actuated by the repeating pattern mechanism.
Figure 7:
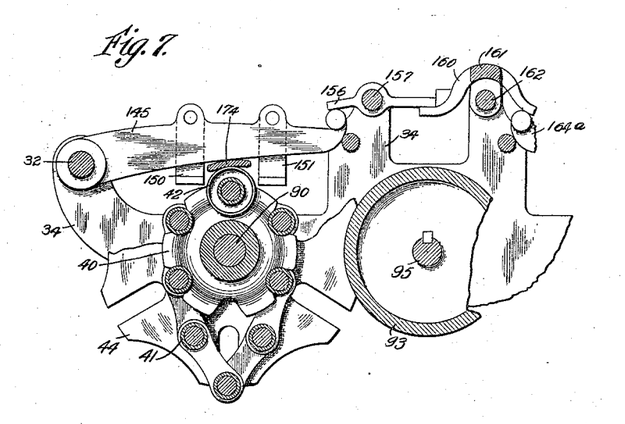
Fig. 7 is a partial sectional elevation taken along the line 7—7 in Fig. 1, certain parts being omitted for the sake of clearness.

In addition to the primary cylinder 40 and the auxiliary cylinder 50 I provide two multiplying cylinders 60 and 70 having pattern chains 61 and 71 provided with rolls 62 and 72 (Figs. 4 and 6). I also provide a repeating cylinder 80 having a chain 81 and roll 82 (Fig. 6) for a purpose to be described.

The pattern cylinders 40 and 50 are loosely mounted upon a rod 90 (Figs. 5 and 9) and the cylinders 60 and 70 are loosely mounted upon a rod 91; the rods 90 and 91 being fixed in the side frame members 33 and 34. The repeating cylinder 80 is mounted upon a short shaft 92 (Figs. 5 and 6) rotatable in a bearing $92^a$ on the frame member 34.

The five pattern cylinders 40, 50, 60, 70 and 80 are each provided with star wheels 44, 54, 64, 74 and 84 formed integral with the respective cylinders or fixed to rotate therewith.

The mechanism for locking and intermittently advancing the star-wheels 44, 54, 64 and 74, comprises a locking drum 93 (Figs. 1, 6 and 13) having a single actuating tooth 94 fixed thereto and forming in effect a one-tooth pinion. The drum 93 is keyed to a shaft 95 and is longitudinally movable thereon by selectively-controlled positioning devices to bring the tooth 94 into coöperative relation with a selected star wheel.

It will be seen that the indicating levers 30 and 31 may be directly actuated by a pattern roll upon either of the cylinders 40 or 50. The multiplying cylinders 60 and 70 are provided with pattern chains which may be of different lengths and are used in the usual way for the purpose of causing a predetermined number of repetitions of a selected indication on the primary cylinder 40 or the auxiliary cylinder 50.

Figure 1:
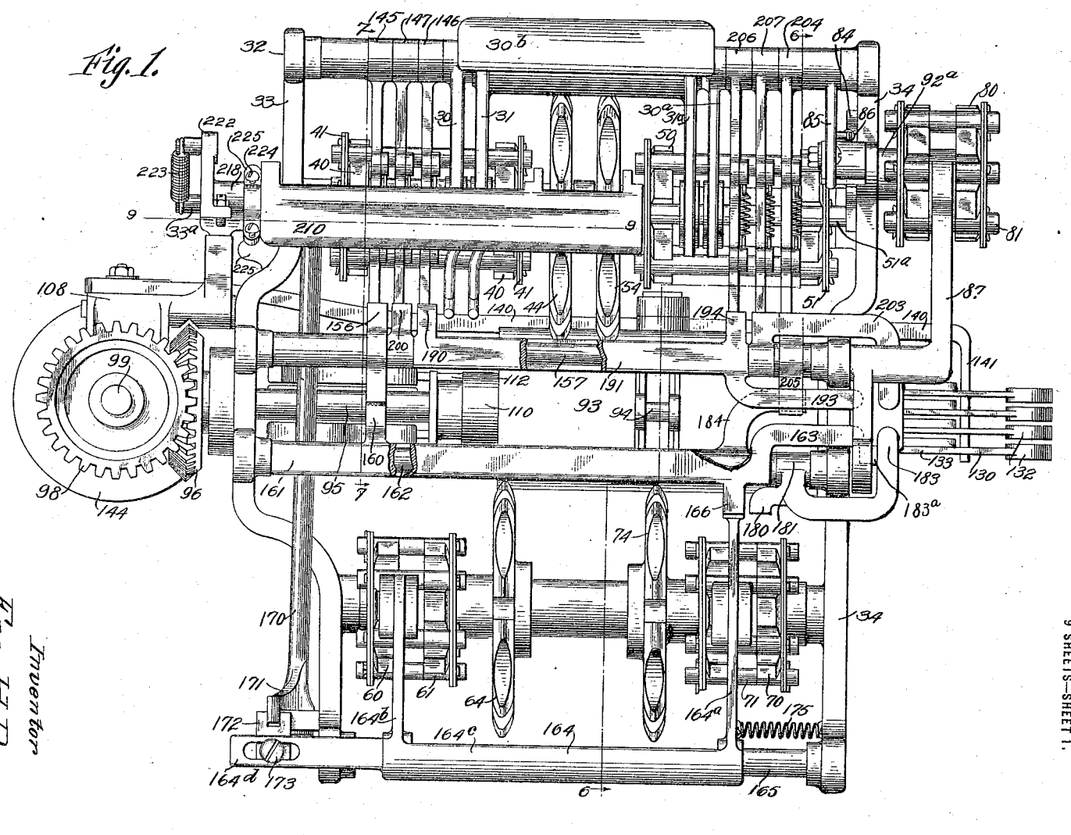
Figure 1 is a plan view of my improved multiplier.
Figure 3:
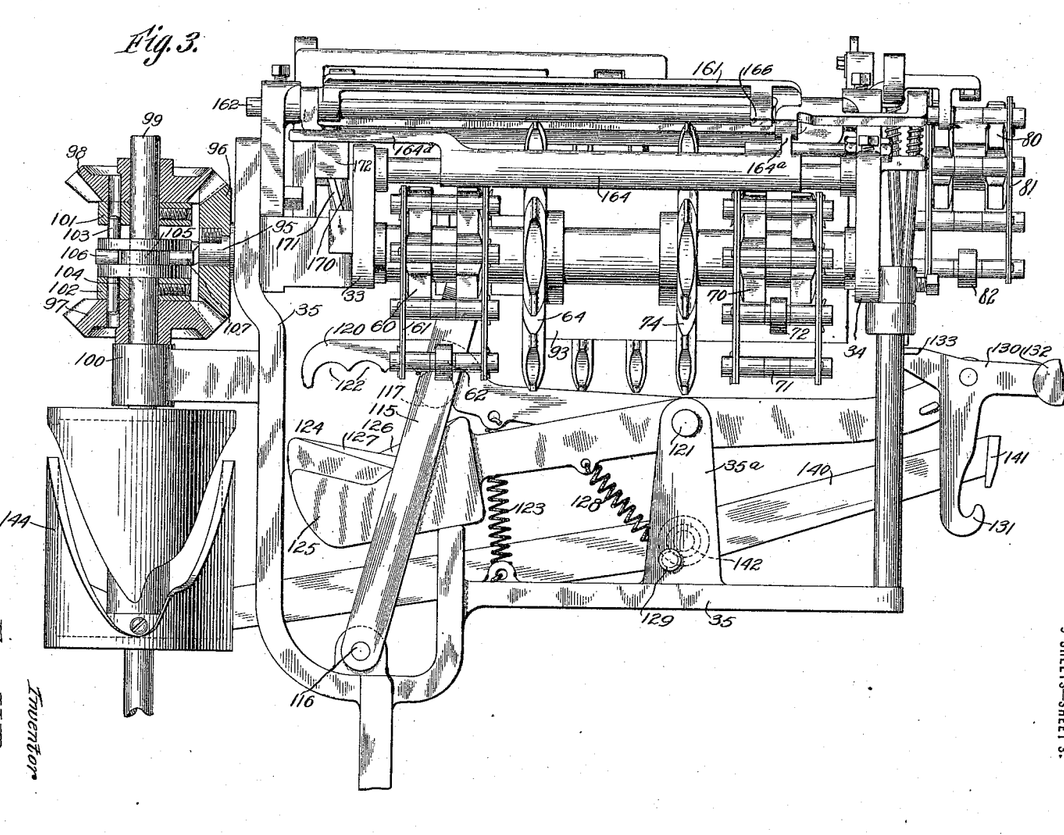
Fig. 3 is a rear elevation of the multiplier.

The shaft 95 is rotatable in bearings in the side frame members 33 and 34 and at its left hand end, as viewed in Figs. 1 and 3, the shaft is provided with a bevel gear 96. The gear 96 meshes with a pair of oppositely-disposed bevel gears 97 and 98 (Fig. 4) loosely mounted upon a vertical driving shaft 99, supported in a bearing 100 and continuously rotated from any suitable source of power.

A pair of driving collars 101 and 102 (Fig. 3) are fixed to the shaft 99 and are provided with longitudinally-alined holes within which studs 103 and 104 are axially movable. The studs 103 and 104 are secured in the two flanges of a sliding collar 105, said flanges being separated by a deep groove adapted to receive the forked ends 106 and 107 (Figs. 3 and 11) of a clutch lever 108. The mechanism for actuating the lever 108 will be hereinafter described.

I will now describe the mechanism which determines which cylinder shall be actuated by the tooth 94 upon the drum 93.

Figures 5, 13, 14:
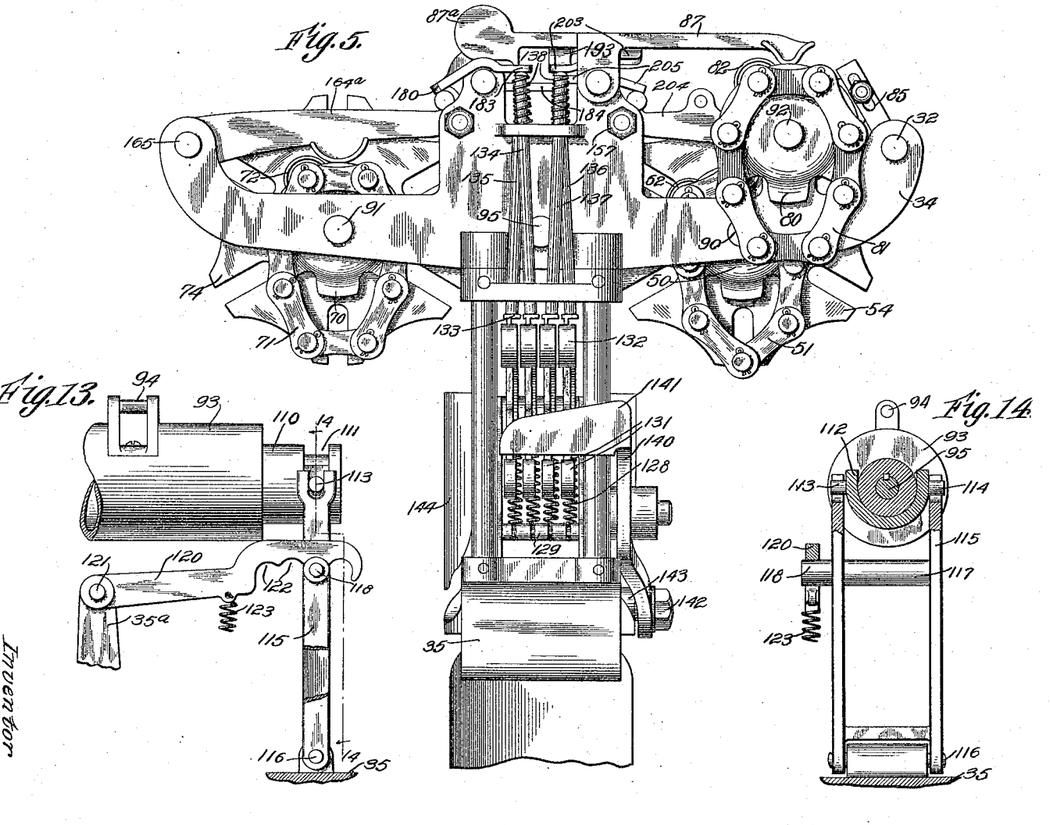
Fig. 5 is a right-hand end elevation.
Fig. 13 is a partial side elevation of the one-tooth pinion and locking drum, together with a portion of the devices for shifting the drum axially, and for holding it in adjusted position.
Fig. 14 is an end elevation partly in section taken substantially along the line 14—14 in Fig. 13.

Referring to Figs. 13 and 14, it will be seen that the drum 93 is provided with an extension 110 at one end thereof having a groove 111 formed therein and adapted to receive a half-collar 112, having pins 113 and 114 at its opposite ends, positioned for engagement in slots formed in the upper ends of the two arms of a forked lever 115, which is pivoted at 116 to the base 35. The lever 115 is provided with a cylindrical cross-bar 117 extending between the two arms of the lever and also having an extension 118 on the outer side of one of the arms, as shown in Fig. 13, both the cross bar and the extension being provided with anti-friction rolls if so desired. The extension 118 is positioned for engagement by a locking lever 120 pivoted at 121 to one of the arms of a stand $35^a$ extending upwardly from the base 35. The lever 120 is provided with a plurality of notches 122 each adapted to coöperate with the extension 118 and to thereby hold the tooth 94 on the drum 93 in position for engagement with one of the star-wheels 44, 54, 64 or 74. A coiled spring 123 is secured at its upper end to the lever 120 and at its lower end to the base 35, and provides a yielding downward pressure which holds one of the notches 122 firmly in engagement with said extension 118.

Figures 17, 18, 19, 20, 21:
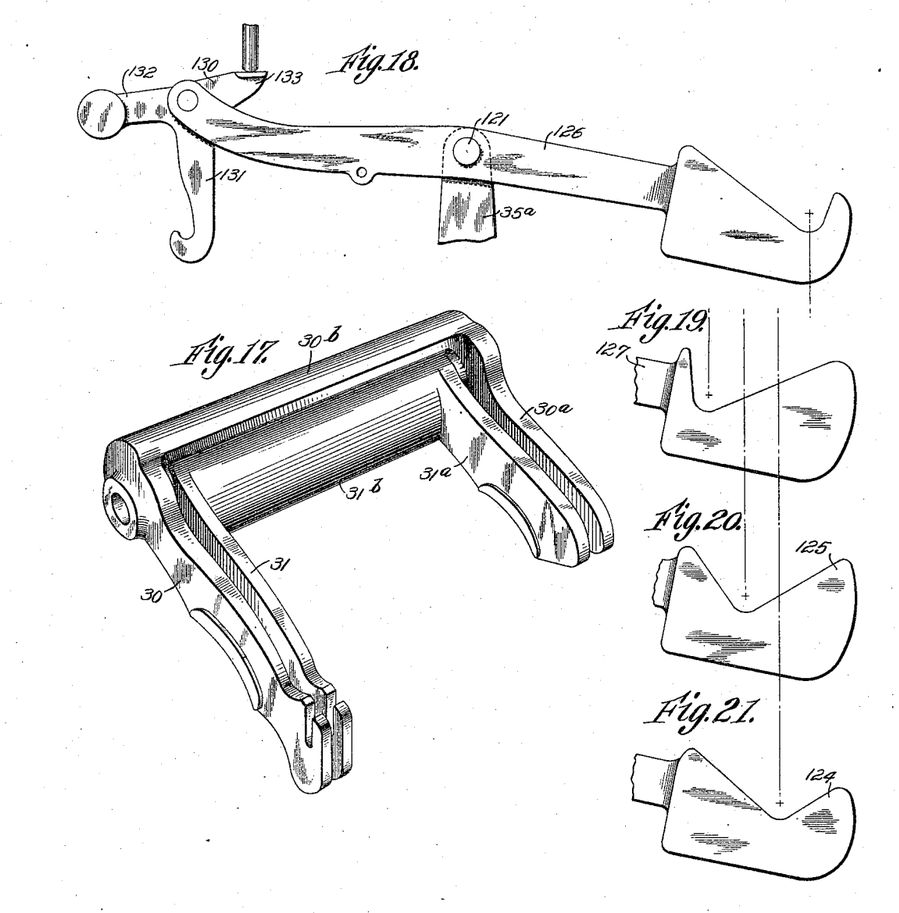
Fig. 17 is a detail perspective view of the indicating levers.
Fig. 18 is a side elevation of one of the positioning levers which determine the longitudinal position of the one-tooth pinion and drum.
Figs. 19, 20 and 21 are fragmentary views of portions of the other positioning levers.

The mechanism for actuating the forked lever 120 comprises a series of positioning levers 124, 125, 126 and 127 (Figs. 2, and 18 to 21) adapted to position the tooth 94 for coöperation with the star-wheels 44, 54, 64 and 74 respectively. The lever 126 is shown in detail in Fig. 18 and fragmentary portions of the levers 127, 125, and 124 are shown in Figs. 19, 20 and 21, respectively. The remaining portions of the levers 127, 125 and 124 are duplicates of the lever 126. These positioning levers are pivoted at 121 to the stand 35ª and are each provided with a spring 128 connected at its upper end to a lever and at its lower end to a stud 129 (Fig. 5) secured between the two arms of the stand 35ª.

Reference to Figs. 18 to 21 will show that the cam-shaped ends of the positioning levers are formed with downwardly extending notches having their lowest points at different distances from the pivot 121. When one of the levers is swung upwardly into engagement with the cylindrical cross-bar 117 the forked lever 115 will be swung in one direction or the other until its cross-bar 117 rests in the lowest point of the notch, in which position it will be held by the locking lever 120. Such movement of the forked lever 115 in turn slides the drum 93 with its single tooth 94 longitudinally upon the shaft 95.

Figure 2:
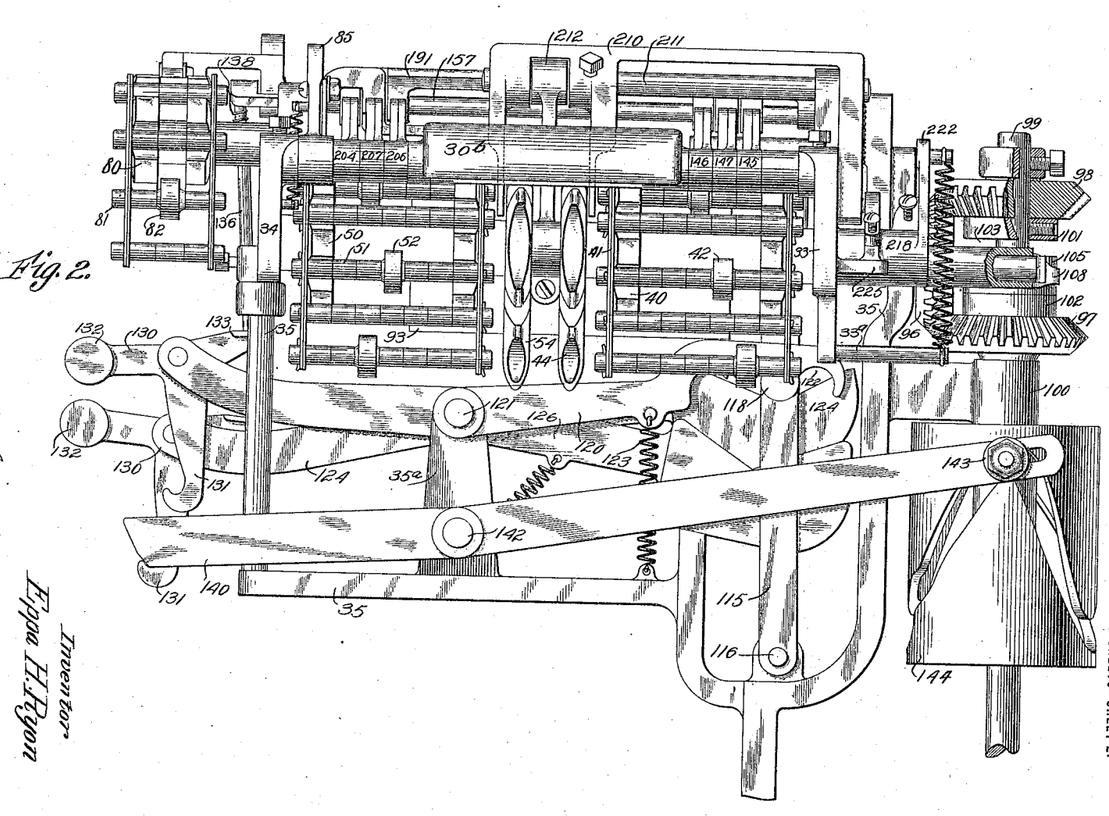
Fig. 2 is a front elevation thereof.
Figure 8:
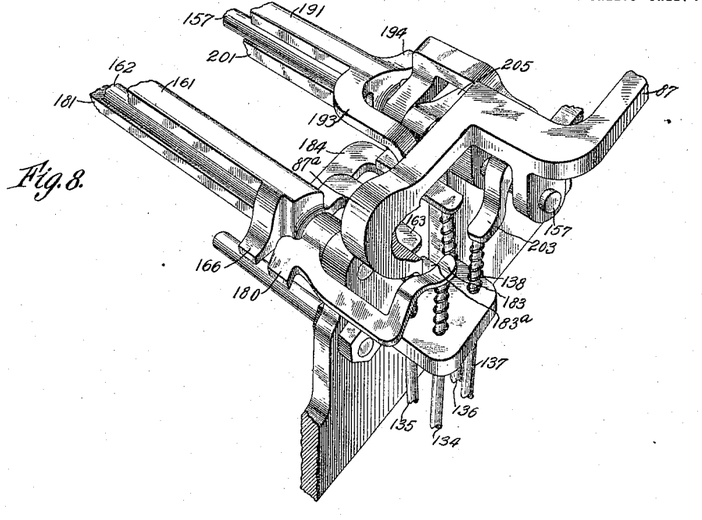
Fig. 8 is a detail perspective view of certain parts of the selective mechanism.

At their left-hand ends, as viewed in Figs. 2 and 18, the positioning levers are each provided with a three-armed engaging member 130, loosely pivoted to the end of its respective positioning lever. Each member 130 comprises a downwardly extending hook-shaped arm 131, a weighted arm 132 and a third arm 133 positioned for engagement with the lower end of one of a series of vertically movable selective pins 134, 135, 136 and 137. The selective pins are normally held in raised position by coiled springs 138 (Figs. 5 and 8) and are engaged at their upper headed ends by selective devices to be described. So long as the selective pins remain in their normal upper position, the engaging members 130 remain in their inoperative positions, as shown in Figs. 3 and 18. Whenever one of the selective pins is pressed downward the corresponding member 130 is swung upon its pivot and its hook-shaped arm 131 is moved into the path of an actuating lever 140 (Figs. 2, 3 and 5) having a transverse extension 141 adapted to coöperate with any one of the engaging members 130 when said member is moved to its operative position. The lever 140 is pivoted at 142 (Fig. 2) to the stand 35ª and is provided at its opposite end with a cam-roll 143 (Figs. 4 and 5) which is adjustable longitudinally on the lever 140, as shown in Fig. 2, and which coöperates with a cam 144 secured to and rotatable with the driving shaft 99. The cam 144 is provided with a continuous cam-groove in its cylindrical surface, the groove being so designed that the lever 140 will make two complete reciprocations to each revolution of the cam 144. The bevel gears 96, 97 and 98 are all of equal size and the shaft 95 consequently makes one revolution for every revolution of the driving-shaft 99. As the shaft 95 is positioned centrally between the rods 90 and 91, the single tooth 94 on the drum 93 comes into position to engage a star-wheel twice during each revolution, just after it has passed its upper and its lower center. It is for this reason that the cam 144 is designed to provide two reciprocations of the actuating lever 140 for each revolution of the driving-shaft.

The selective devices (to be described) are arranged to depress one of the selective pins 134, 135, 136 or 137, while the tooth 94 is still in engagement with one of the star-wheels. While the selected pin is thus depressed, the cam-roll of the actuating lever 140 is given a quick upward movement by that portion of the cam 144 which is shown at the front in Fig. 3. This movement depresses the transverse extension 141 of the lever 140, causing it to engage the hook-shaped arm 131 of the selected engaging member 130. The angle of the groove in the cam 144 is changed at this point to provide a slow movement of the actuating lever until the tooth 94 is disengaged from the star-wheel with which it is then coöperating. The steep angle of the cam-groove is then restored, giving a quick upward movement of the cam-roll and a quick depression of the transverse extension 141. This movement of the extension 141 carries the indicated positioning lever, for instance the lever 124 (Fig. 2), upwardly into engagement with the cylindrical cross-bar 117, and by engagement therewith swings the forked lever 115 about its pivot 116, thus sliding the drum 93 along the shaft 95 until the tooth 94 is positioned for engagement with the star-wheel 44, in which position it is retained by the locking lever 120. The actuating lever 140 is then moved in the reverse direction by the cam 144, raising its transverse member 141 and releasing the engaging member 130. The parts will remain in this position, with the tooth 94 in engagement with the star-wheel 44, until some other selective pin is depressed to move the corresponding engaging member 130 in the path of the transverse extension 141 of the actuating lever 140.

Referring particularly to Fig. 1, it will be seen that the pattern cylinder 40 is designed to operate three levers 145, 146, and 147 in addition to the indicating levers 30 and 31. These additional levers I have designated as starting levers, as they control the shifting of the drum 93 to cause the tooth 94 to coöperate with the pattern cylinders 50, 60 and 70 respectively. One of these starting levers is shown in detail in Fig. 15, wherein it will be seen that the lever (for example, the lever 145) is provided with two roll-engaging arms 150 and 151 pivoted thereto at 152 and 153. The arms 150 and 151 are yieldingly drawn toward each other by a spring 154 until they each engage a shoulder at the end of a projection 155 formed on the side of the lever. The purpose of the arms 150 and 151 will be more clearly evident by reference to Fig. 7, in which it will appear that the arms are positioned for engagement by the roll 42 upon the primary pattern cylinder 40, as the roll passes from one position of rest to the next succeeding position. Assuming that the cylinder is advancing in a clockwise direction, the roll 42 will have engaged the arm 150 to raise the starting lever 145 as it passes to the position shown in the drawing. As it completes its movement, the roll 42 advances beyond the range of the arm 150 thus permitting the starting lever to return to its normal or inoperative position. When the roll next advances in a clockwise position, it will engage the arm 151, but as the arm is free to swing away from the shoulder upon the projection 155, the roll will pass under the arm without changing the position of the lever 145.

It is necessary that the cylinders 40 and 50 stop with the uppermost position of the rolls directly above the axis in order that the rolls which actuate the indicating levers 30 and 31 may hold the levers in raised position, when desired, during subsequent operations of the loom. With the cylinders 60 and 70, which do not directly operate the indicating levers 30 and 31, it is not necessary to stop the cylinders with the rolls at the highest point and consequently a starting lever of simpler construction can be used.

At its free end the starting lever 145 engages an idle lever 156 loosely pivoted upon a rod 157 (Fig. 7) supported in bearings in the side-frame members 33 and 34. The opposite end of the idle lever 156 overlies an arm 160 of a selective lever 161 loosely pivoted upon a rod 162 also supported in bearings in the side-frame members 33 and 34. The selective lever 161 is provided with a longitudinally extending arm 163 (Figs. 1 and 8), the end thereof overlying the selective pin 135 which controls the positioning lever 125, which latter lever, when actuated, moves the tooth 94 into position to coöperate with the star-wheel 54, to advance the cylinder 50.

In order that the multiplying cylinders 60 and 70 may also be effective to indicate an advance of the cylinder 50, I provide a compound starting lever 164 (Fig. 1) for the two cylinders 60 and 70, said starting lever comprising two arms 164ª and 164ᵇ, rigidly connected by an intermediate portion 164ᶜ and rotatable upon a rod 165 mounted in the side-frame members 33 and 34. This compound starting lever 164 is longitudinally movable upon the rod 165 and when in its right-hand position, as shown in Fig. 1, the end of the arm 164ª is positioned to engage an arm 166 formed on the selective lever 161. When the parts are thus positioned, the compound starting lever 164 will be raised whenever a ball 62 or 72 on the pattern chains 61 or 71 comes beneath the arm 164ᵇ or the arm 164ª respectively. When the lever 164 is thus raised, the arm 164ª will raise the arm 166 of the selective lever 161, thus depressing the arm 163 and the selective pin 135 to start the cylinder 50.

Figure 10:
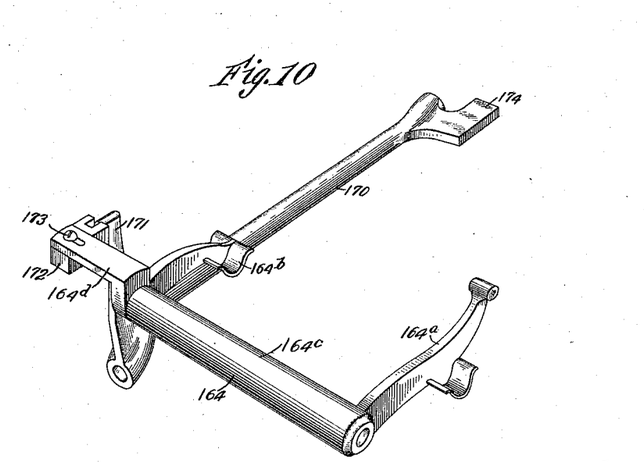
Fig. 10 is a detail perspective view of the device for shifting the compound starting lever.

The longitudinal shifting of the compound starting lever is controlled by a transversely extending shaft 170 (Figs. 1 and 10) pivotally supported at its ends by suitable bearings on the side-frame member 33 and having an upwardly extending arm 171 engaging a slotted block 172, adjustably secured by a screw 173 to an extension 164ᵈ of the compound starting lever 164. At its opposite end the shaft 170 is provided with an offset projection 174 (Fig. 10) which is positioned for engagement with the roll 42 (Fig. 7) which actuates the lever 145. As this roll 42 approaches its uppermost position, when moving in either direction, it will engage one of the arms 150 or 151 to actuate the starting lever 145, which controls the selective mechanism for the cylinder 50. As the roll reaches its uppermost position it raises the offset projection 174 of the shaft 176, thus moving the arm 171 and the block 172 to the left (as viewed in Fig. 1) and positioning the compound starting lever 164 so that its arm 164ª will engage the arm 166, thus permitting the multiplying cylinders 60 and 70 to control the auxiliary cylinder 50. When the roll 42 upon the cylinder 40 is advanced and passes out from under the offset projection 174, the starting lever 164 will be moved to the right (in Fig. 1) by a spring 175 secured at one end to the arm 164ª and at the other end to the frame member 34. In its right-hand position the compound starting lever will control the operation of the primary cylinder 40, by engagement with an arm 180 (Figs. 1 and 8) formed upon a selective lever 181 also pivoted upon the rod 162 and having an arm 183 extending into position to engage the selective pin 134 which controls the positioning lever 124 and thereby causes the tooth 94 to coöperate with the star-wheel 44 of the cylinder 40. Thus by the provision of the shifting shaft 170 and the compound starting lever 164 having the two arms 164ª and 164ᵇ positioned for operation by the cylinders 60 and 70 I am enabled to control either the cylinder 40 or the cylinder 50 from either one of the multiplying cylinders 60 or 70.

I will now describe the connections by which the multiplying cylinder 60 may be started from the pattern chain 41 upon the primary cylinder 40.

Assuming that the pattern chain is provided with a roll 42 positioned to engage and raise the starting lever 146 (Fig. 1), said lever will engage an arm 190 formed upon a selective lever 191 pivoted upon the rod 157, and having a longitudinally-extending arm 193 with its end positioned to engage the selective pin 136 which controls the positioning lever 126 for starting the cylinder 60. In a similar manner the starting lever 147 overlying the cylinder 40 coöperates with an arm 200 formed upon a selective lever 201 (Figs. 6 and 8) also pivoted upon the rod 157 and having a longitudinally-extending arm 203 with its end engaging the selective pin 137 which controls the positioning lever 127 and the multiplying cylinder 70. Through the connections thus described it will be evident that by proper placing of the pattern rolls 42 beneath the starting levers 145, 146 and 147, the operations of the cylinders 50, 60 and 70 may be readily controlled. The auxiliary pattern cylinder 50 is similarly provided with three starting levers, 204, 206 and 207. The starting lever 204 engages an idle lever 205 (Figs. 1 and 8) loosely mounted upon the rod 157 and having its opposite end overlying and engaging an arm 184 formed upon the selective lever 181 which controls the primary cylinder 40. The starting lever 206 engages directly with an arm 194 upon the selective lever 191, thus controlling the operation of the multiplying cylinder 60. In a similar manner the starting lever 207 engages a portion of the arm 203 of the selective lever 201 and thus controls the multiplying cylinder 70.

Through the connections thus far described it will be seen that the pattern cylinders 40 and 50 are each arranged to control the operation of three other pattern cylinders, while the pattern cylinders 60 and 70 are each arranged to control the operation of the cylinders 40 and 50 and that through the shifting of the compound starting lever 164 the multiplying cylinders always coöperate with the cylinder 40 or 50 which has started them in operation.

It is sometimes desirable to cause a large number of repetitions of the indications of a certain pattern chain. For instance, it may be assumed that the primary cylinder 40 is to be used to indicate the weaving of a border upon a blanket or other similar article, while the auxiliary cylinder 50 is to be used for the weaving of the body of the article. It usually happens that the body of the article is formed of a large number of repetitions of a comparatively simple pattern. In order that the pattern chain 51 need contain only a single set of indications, I provide the repeating cylinder 80 having the chain 81 with a single roll 82 (Fig. 6) mounted thereon and movable by a starwheel 84, as previously described. The starwheel 84 is engaged by the outwardly extending end of a rod 51ª (Fig. 1) which forms one of the pivots of the pattern chain 51. The chain 51 contains only a single extended rod 51ª, so that the star-wheel 84 will be advanced one step only for each repetition of the indications of the chain 51. The starwheel 84 is held against accidental misplacement by a locking lever 85, (Fig 6) pivoted upon the rod 32 and drawn into engagement with the teeth of the star-wheel 84 by a tension spring 86. The single roll 82 upon the pattern chain 81, when it reaches its uppermost position, actuates a starting lever 87 (Fig. 6) shown in detail in Fig. 16. The lever 87 is loosely pivoted upon the rod 157 and with its opposite weighted end 87ª engages a lip 183ª formed on the arm 183 of the selective lever 181 which controls the starting of the primary cylinder 40. Through these connections the repeating cylinder 80 is enabled to start the primary cylinder 40 after any given number of repetitions of the pattern chain upon the auxiliary cylinder 50, the number of repetitions being determined by the number of links in the repeating cylinder chain 81.

Figure 9:
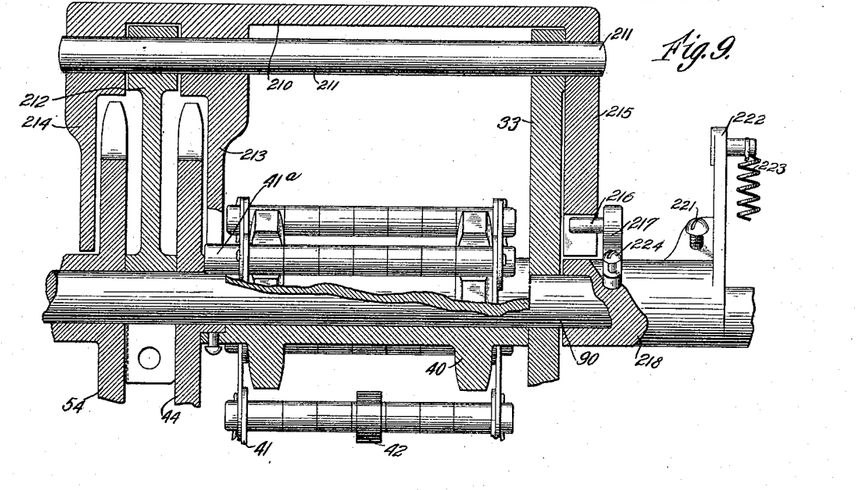
Fig. 9 is a sectional elevation of a portion of the reversing mechanism, taken substantially along the line 9—9 in Fig. 1.

It is frequently desirable to reverse the movement of the pattern chain at a given point in the pattern which is being indicated upon either the primary or the auxiliary cylinder and for this purpose I provide the reversing mechanism shown in detail in Figs. 9, 11 and 12. Referring particularly to Fig. 9, I have provided a reversing lever 210 pivoted upon a rod 211 which is supported at one end by the side frame 33 and at its opposite end in a stand 212 clamped to the fixed rod 90. The reversing lever 210 is provided with depending arms 213 and 214 and 215. The arm 213 is positioned for engagement by the extended end of a rod 41ª forming one of the pivots of the pattern chain 41, while the arm 214 is positioned for similar engagement by an extended pivot rod in the pattern chain 51. The third arm 215 is slotted at its lower end and engages a stud 216 mounted upon an arm 217 of an intermediate lever 218, pivoted on the rod 90. The lever 218 is provided with flanges 219 and 220 (Figs. 4 and 12) through which are threaded adjusting screws 221 adapted to engage the opposite sides of a lug 109 forming a part of the clutch lever 108 previously described. As the depending arms 213 and 214 are moved in either direction by engagement with an extended rod in one of the chains 41 or 51, the intermediate lever will be correspondingly moved and through the screws 221 will engage the lug 109, thus moving the clutch lever 108 and shifting the clutch pins 103 and 104 to change the driving connection between the shaft 99 and the gears 97 and 98. To prevent accidental reversal of the mechanism the intermediate lever 218 is provided with the upwardly extending arm 222 to which is connected a spring 223 (Fig. 4) extending downward to a point below the center of the rod 90 where it is secured to a projection 33ᵃ of the frame member 33. The spring 223 operates to retain the intermediate lever 218 in either of its extreme positions until forcibly displaced therefrom, said extreme positions being determined by the engagement of adjusting screws 224 (Fig. 12) with lugs 225 (Figs. 1 and 4) formed on the frame member 33.

It has been pointed out that the rolls upon the pattern chains 41 and 51 actuate their respective starting levers during their advance movement only and that the levers return to their lower or inoperative positions as the rolls come to rest. The same result is obtained with the chains 61 and 71 by stopping the cylinders 60 and 70 with the rolls removed from their highest positions and by providing the starting lever arms 164ᵃ and 164ᵇ with downwardly-convex roll-engaging surfaces, all as shown in Fig. 6. This arrangement permits all parts of the selective devices to return immediately to normal inoperative position after the upward movement of the actuating lever 140, and the mechanism is thus arranged for any subsequent indication which may be desired. I thus avoid the necessity of advancing the pattern chain last indicated, before a new indication can be made. This has been unavoidable in the multipliers of the prior art, in which the rolls have come to rest with their starting levers in raised or operative position. This new construction greatly simplifies the pattern chains.

Having thus described my invention and the operation of the several parts thereof it will be evident that many changes and modifications can be made therein by those skilled in the art without departing from the spirit and scope thereof as set forth in the claims, and I do not wish to be otherwise limited to the details herein disclosed, but

What I claim is:—

1. A multiplier having, in combination, a plurality of pattern cylinders, a single actuator, a power-driven member, and selective devices controlled from said cylinders by means of which said member is rendered effective to bring said actuator into operative relation with any one of said cylinders.

2. A multiplier having, in combination, a primary cylinder, an auxiliary cylinder, and two multiplying cylinders, each of said cylinders being provided with a star-wheel, a single one-tooth pinion axially movable to coöperate with any one of said star wheels, and means to move said pinion axially.

3. A multiplier having, in combination, a primary cylinder, an auxiliary cylinder, and two multiplying cylinders, each of said cylinders being provided with a star-wheel and a single one-tooth pinion axially movable to coöperate with any one of said star wheels, and pattern-controlled means for adjusting said pinion axially.

4. A multiplier having, in combination, a primary cylinder, an auxiliary cylinder, and two multiplying cylinders, each of said cylinders being provided with a star-wheel, and a single one-tooth pinion axially movable to coöperate with any one of said star-wheels, the single tooth of said pinion being carried by a locking drum extending axially on both sides of said tooth and having connection at one end thereof with pattern-controlled devices for positioning said drum and tooth in predetermined operative relation with said star wheels.

5. A multiplier having, in combination, a primary cylinder, an auxiliary cylinder, and two multiplying cylinders, each of said cylinders being provided with a star-wheel, a single one-tooth pinion axially movable to coöperate with any one of said star-wheels, the single tooth of said pinion being carried by a locking drum extending axially on both sides of said tooth, an actuator for moving said drum axially, and selective devices effective to connect said actuator to move said drum to a selected predetermined position.

6. A multiplier having, in combination, a primary cylinder, an auxiliary cylinder, and two multiplying cylinders, each of said cylinders being provided with a star-wheel, a single one-tooth pinion axially movable to coöperate with any one of said star-wheels, the single tooth of said pinion being carried by a locking drum extending axially on both sides of said tooth, an actuator for moving said drum axially, selective devices effective to connect said actuator to move said drum to a selected predetermined position, and means to retain said drum in said position.

7. A multiplier having, in combination, a plurality of pattern cylinders, a single actuator, and selective devices effective to bring said actuator into operative relation with any one of said cylinders, said devices comprising a power-actuated member, a series of positioning levers, an engaging member mounted on each lever, and pattern-controlled means for moving a selected engaging member into the path of said power-actuated member.

8. A multiplier having, in combination, a plurality of pattern cylinders, a single actuator, and selective devices effective to bring said actuator into operative relation with any one of said cylinders, said devices comprising a power-actuated member, a series of positioning levers, an engaging member mounted on each lever, and pattern-controlled means for moving a selected engaging member into the path of said power-actuated member, said means being operative as a cylinder is angularly advanced and returning to inoperative position as the cylinder comes to rest.

9. A multiplier having, in combination, a plurality of pattern cylinders, a single actuator, and selective devices effective to bring said actuator into operative relation with any one of said cylinders, said devices comprising a power-actuated member, a series of positioning levers, an engaging member mounted on each lever, and pattern-controlled means for moving a selected engaging member into the path of said power-actuated member, said means being operative as a cylinder is angularly advanced in either direction and returning to inoperative position as the cylinder comes to rest.

10. A multiplier having, in combination, a plurality of pattern cylinders, a single actuator, and selective devices effective to bring said actuator into operative relation with any one of said cylinders, said devices comprising a power actuated member, a series of positioning levers, an engaging member pivoted to each lever, a plurality of normally-raised selective pins, each adapted to move one of said members, and pattern-controlled devices for selectively depressing said pins.

11. A multiplier having, in combination, a plurality of pattern cylinders, a single actuator, and selective devices effective to bring said actuator into operative relation with any one of said cylinders, said devices comprising a power-actuated member, a series of positioning levers, an engaging member pivoted to each lever, a plurality of normally-raised selective pins, each adapted to move one of said members, a selective rocking lever for each pin, and a plurality of starting levers each operable by a pattern cylinder to rock one of said selective levers and to thereby depress one of said pins.

12. A multiplier having, in combination, a plurality of pattern cylinders, a single actuator, means for moving said actuator, and selective devices effective to bring said actuator into operative relation with any one of said cylinders, said devices comprising a power-actuated member, a series of positioning levers, an engaging member on each lever, and pattern-controlled means for moving a selected engaging member into the path of said power-actuated member, and said means providing an initial movement of said power-actuated member to engage the selected engaging member, a dwell during which the controlling pattern cylinder may come to rest, an actuating movement, and a reverse movement successively.

13. In a multiplier, a pattern cylinder, a pattern chain and rolls carried thereby, means to advance said cylinder, chain and rolls intermittently to successive positions of rest, and indicating levers and starting levers operable by said rolls, said indicating levers each having a portion positioned for engagement by one of said rolls whereby the lever may be raised and supported by the roll when the roll is in its position of rest and said starting levers each having a portion positioned for engagement and actuated by one of said rolls during the movement of the roll from one position of rest to a succeeding position of rest, said starting levers returning to normal inoperative position as the roll comes to rest.

14. In a multiplier, a pattern cylinder, a pattern chain and rolls carried thereby, and indicating levers and starting levers operable by said chain, said starting levers each having a pair of swinging arms pivoted thereto, each arm being positioned to effectively engage a roll approaching its upper position of rest in one direction.

15. In a multiplier, a pattern cylinder, a pattern chain and rolls carried thereby, and indicating levers and starting levers operable by said chain, said starting levers each having a pair of swinging arms pivoted thereto, each arm being positioned to effectively engage a roll approaching its upper position of rest in one direction, and both arms being free from said roll when the roll is in its upper position of rest.

16. A multiplier having, in combination, a primary pattern cylinder, an auxiliary cylinder, two multiplying cylinders, a compound starting lever operable directly by either of said multiplying cylinders, and means to move said lever to control either the primary or the auxiliary cylinder.

17. A multiplier having, in combination, a primary pattern cylinder, an auxiliary cylinder, two multiplying cylinders, a compound starting lever, operable directly by either of said multiplying cylinders, and means to set said lever to control either the primary or the auxiliary cylinder, said means comprising a shifting device operable by a pattern roll on the primary cylinder.

18. A multiplier having, in combination, a primary pattern cylinder, an auxiliary cylinder, two multiplying cylinders, starting levers for controlling said cylinders, including a compound starting lever operable directly by either of said multiplying cylinders, and means to set said compound lever to control either the primary or the auxiliary pattern cylinder, said means comprising a shifting lever operable by any roll upon the primary pattern chain which is effective to lift the starting lever which controls the actuation of the auxiliary pattern cylinder.

19. A multiplier having, in combination, a primary pattern cylinder, an auxiliary cylinder, a repeating cylinder, and pattern chains for each of said cylinders, the repeating cylinder and chain being effective to determine the number of successive repetitions of the pattern of the auxiliary pattern chain.

20. A multiplier having, in combination, a pattern cylinder with a pattern chain thereon, a repeating cylinder adapted to be advanced by said pattern chain once in each repetition thereof, a second pattern cylinder, and means whereby the second pattern cylinder will be actuated after the repeating cylinder has been advanced a predetermined number of times by the chain of the first named cylinder.

21. A multiplier having, in combination, two pattern cylinders, a repeating cylinder, a pattern chain for each of said cylinders, a star-wheel by which each cylinder may be intermittently advanced, and a starting lever operable by the chain on the repeating cylinder, the pattern chain of one of said pattern cylinders being effective to engage and advance the star-wheel of the repeating cylinder once in each repetition of the pattern, and the chain upon the repeating cylinder being effective to operate said starting lever to start the second pattern cylinder after the repeating cylinder has been intermittently advanced a predetermined number of times.

22. A multiplier having, in combination, primary and auxiliary pattern cylinders, multiplying cylinders, pattern chains on said cylinders, a single driving member for intermittently advancing said cylinders, means for selectively positioning said driving member, a driving shaft, reversible driving connections between said shaft and said member, and mechanism under the control of both the primary and the auxiliary pattern chains for reversing said driving connection.

23. A multiplier having, in combination, primary and auxiliary pattern cylinders, multiplying cylinders, pattern chains on said cylinders, a single driving member for intermittently advancing said cylinders, means for selectively positioning said driving member, a driving shaft, reversible driving connections between said shaft and said member, and mechanism under the control of both the primary and the auxiliary pattern chains for reversing said driving connection whenever either chain reaches a predetermined position while advancing in either direction.

24. A multiplier having, in combination, a primary pattern cylinder, an auxiliary pattern cylinder, two multiplying cylinders, a repeating cylinder, and controlling devices for causing intermittent advance of said cylinders, said primary cylinder being directly controlled by said auxiliary cylinder, said two multiplying cylinders, and said repeating cylinder.

In testimony whereof I have hereunto set my hand.

EPPA H. RYON.

Copies of this patent may be obtained for five cents each, by addressing the "Commissioner of Patents, Washington, D. C."